(No Model.)
G. W. HAYDEN.
ENGINEER'S BRAKE VALVE.
No. 551,378. Patented Dec. 17, 1895.
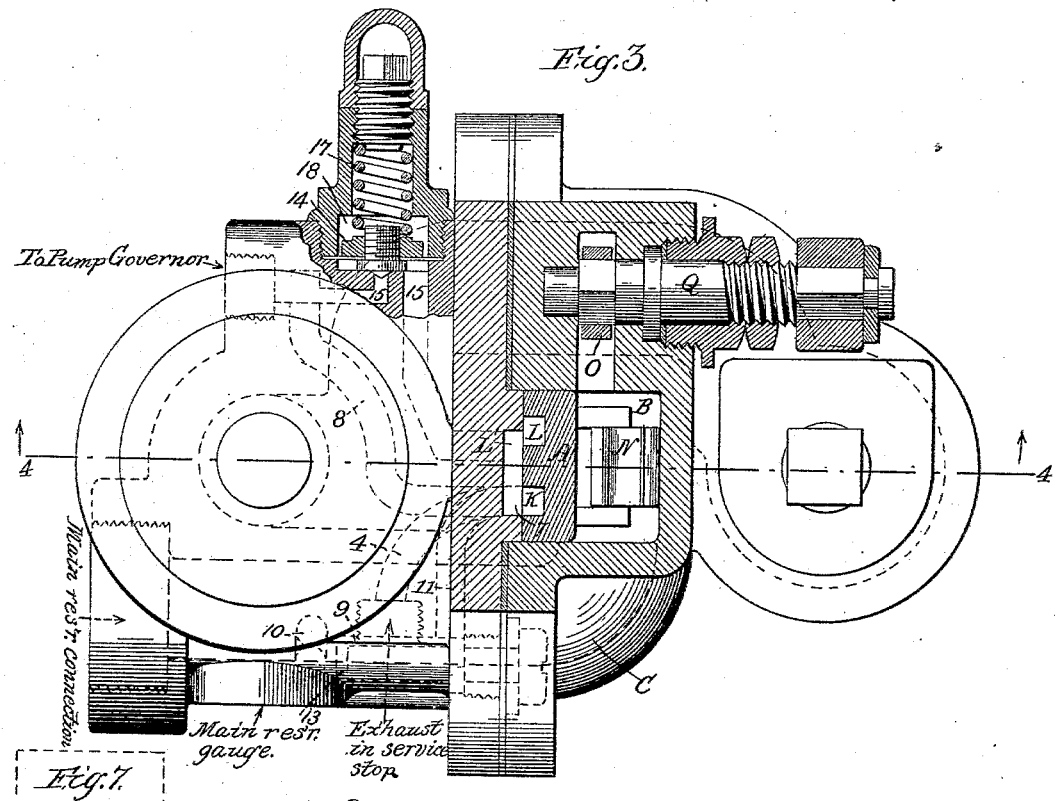
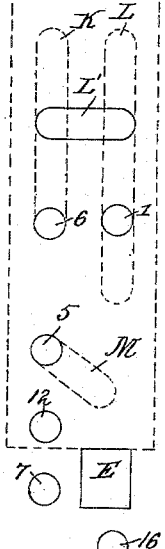
Release
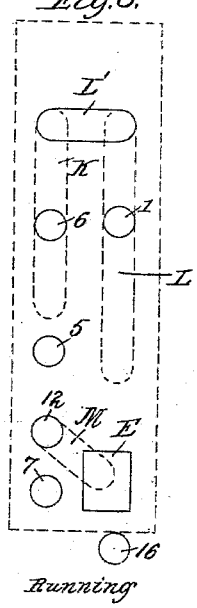
Running
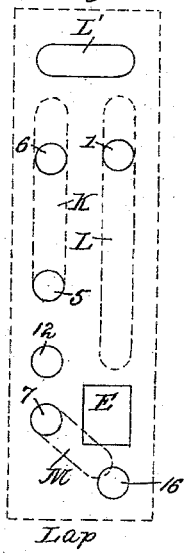
Lap
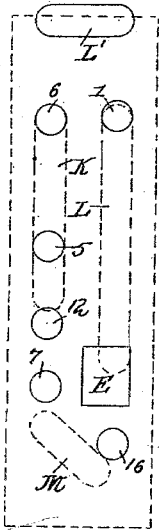
Service
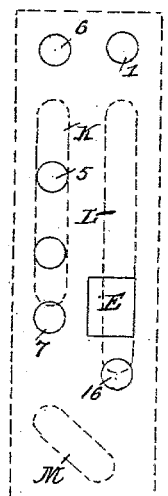
Emergency
Witnesses.
Wm. M. Rheem
Todd Mason
Inventor
Geo. W. Hayden
By Raymond and Omohundro Attys

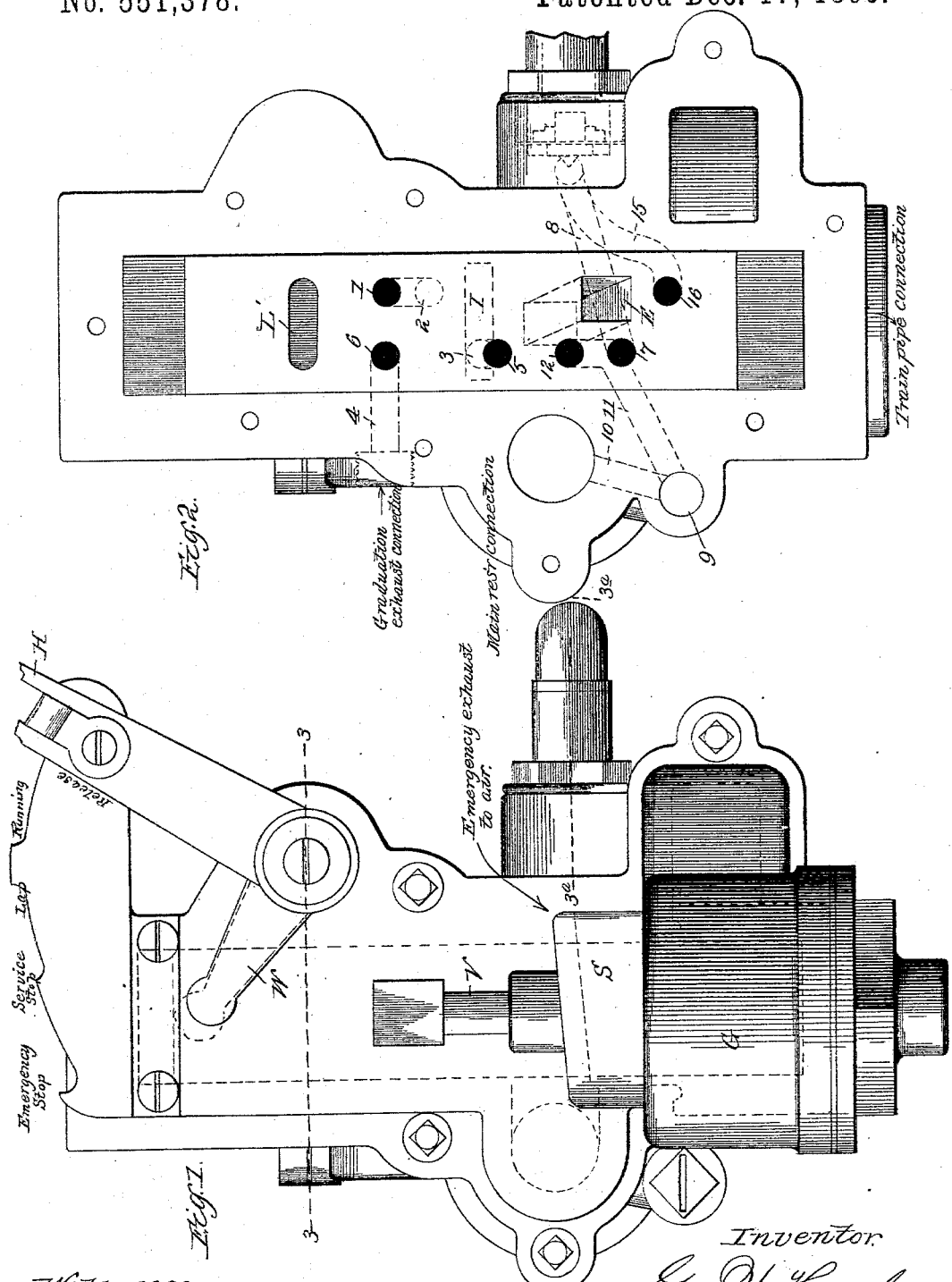

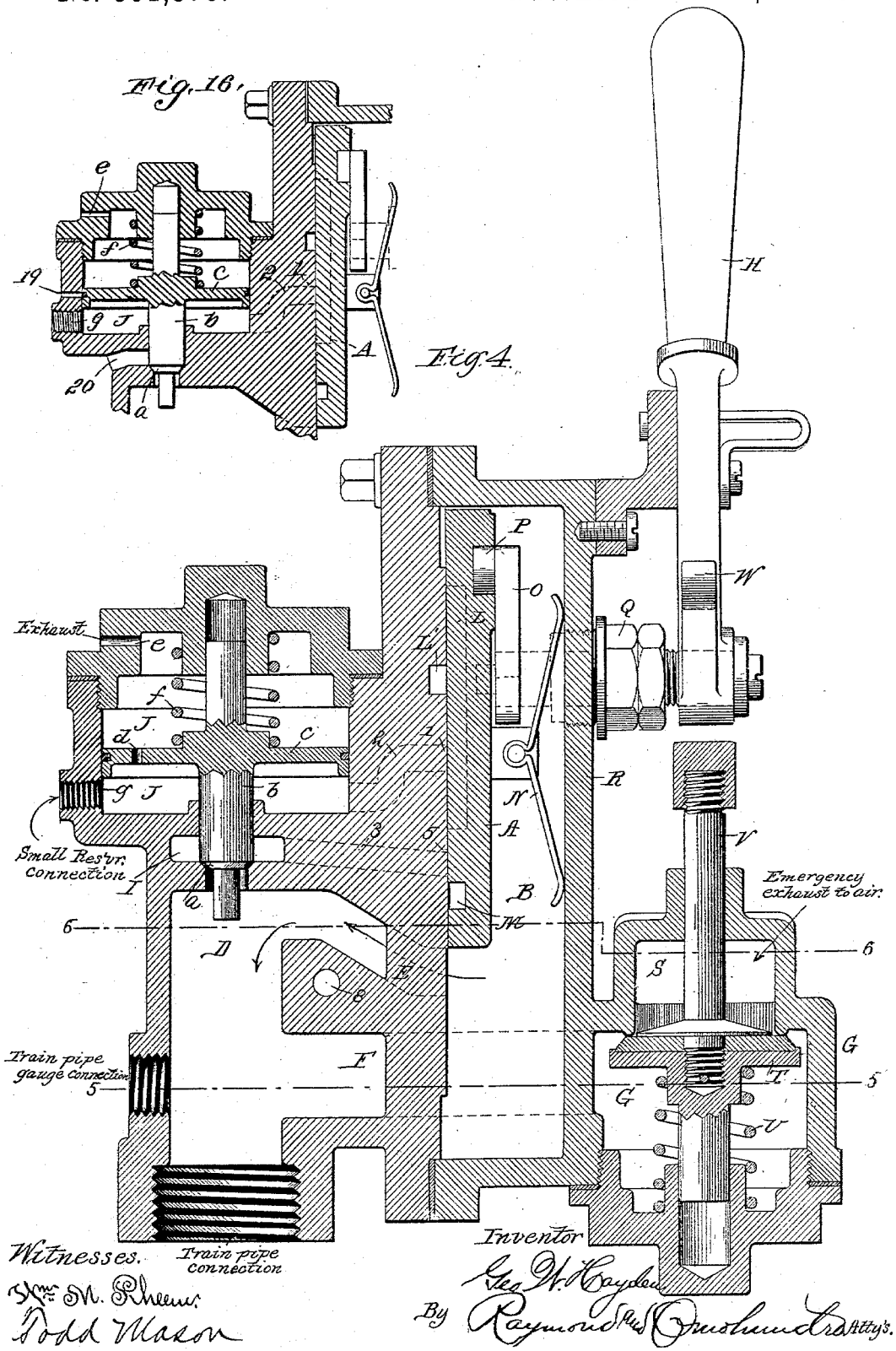

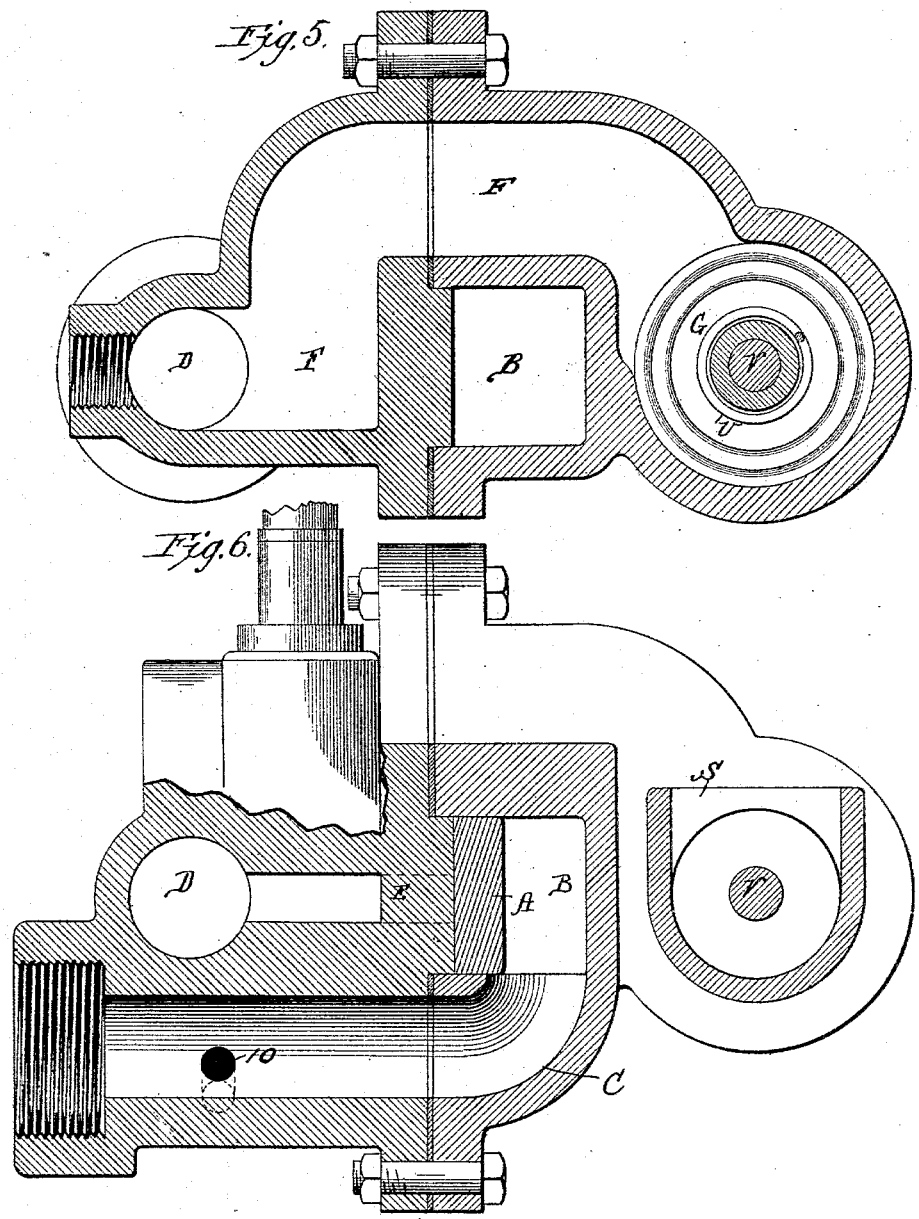

(No Model.)  6 Sheets—Sheet 5.
G. W. HAYDEN.
ENGINEER'S BRAKE VALVE.
No. 551,378.  Patented Dec. 17, 1895.
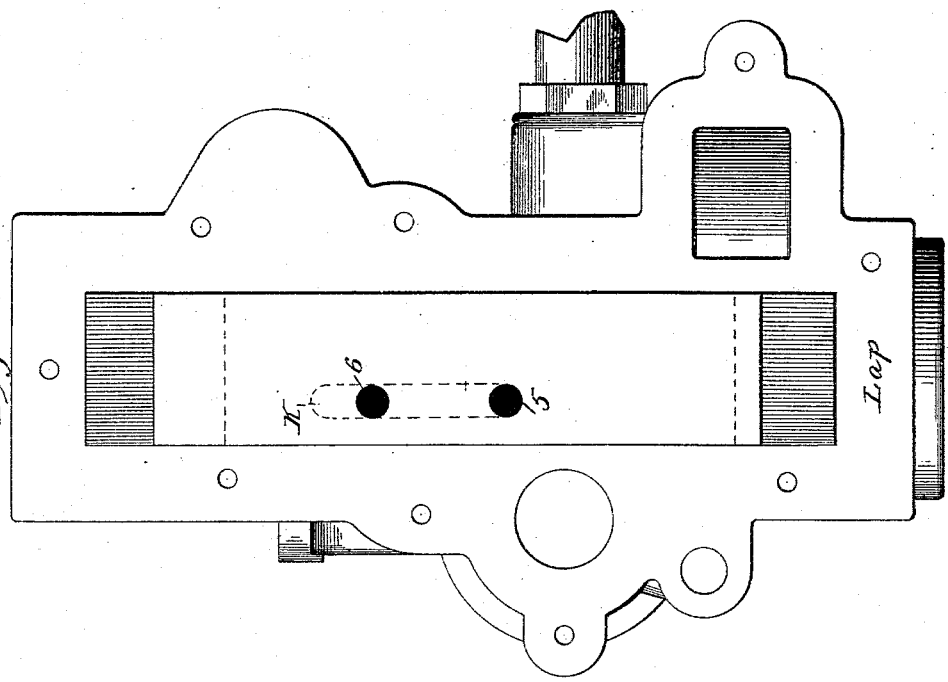
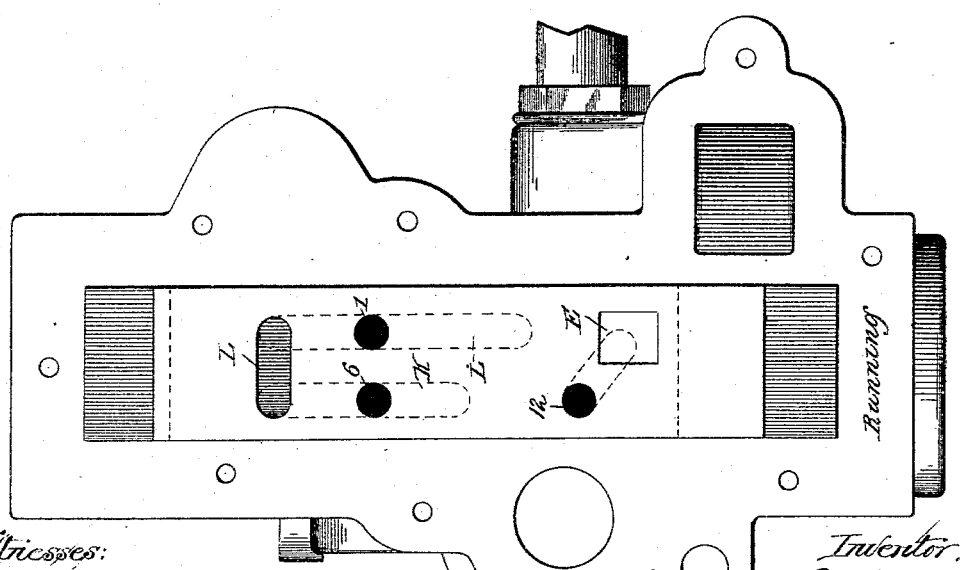
Witnesses:
Wm. M. Rheem.
Todd Mason.
Inventor:
G. W. Hayden
By Raymond & Onohundro
Attorneys.

(No Model.) 6 Sheets—Sheet 6.
G. W. HAYDEN.
ENGINEER'S BRAKE VALVE.
No. 551,378. Patented Dec. 17, 1895.
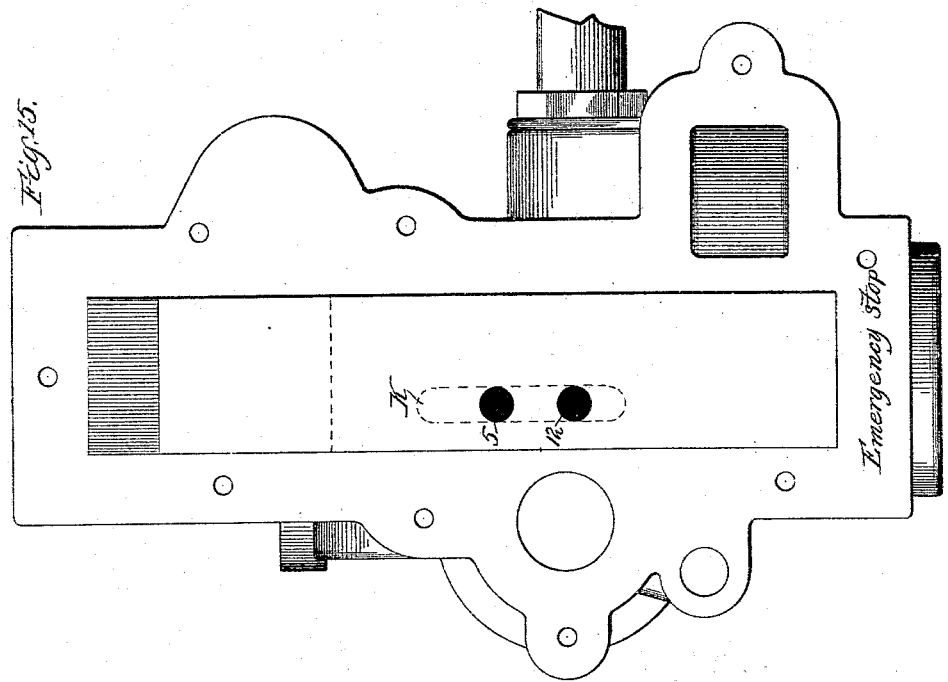
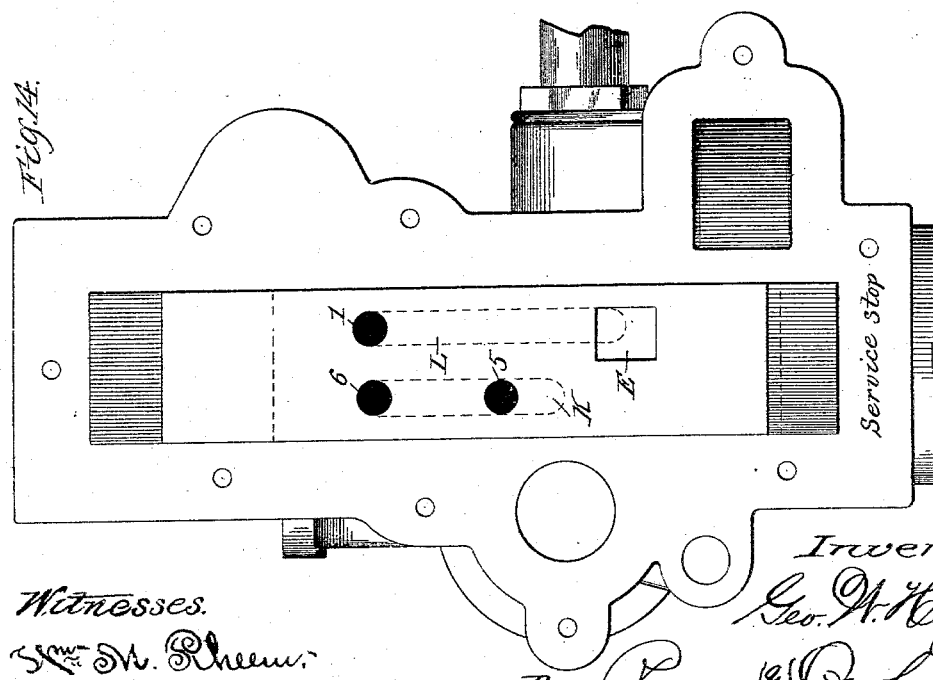
Witnesses.
Inventor
Geo. W. Hayden
By Raymond & Onohundro
Atty's.

UNITED STATES PATENT OFFICE.

GEORGE W. HAYDEN, OF CHICAGO, ILLINOIS, ASSIGNOR TO THE CRANE COMPANY, OF ILLINOIS.

ENGINEER'S BRAKE-VALVE.

SPECIFICATION forming part of Letters Patent No. 551,378, dated December 17, 1895.

Application filed February 11, 1893. Serial No. 461,925. (No model.)

*To all whom it may concern:*

Be it known that I, GEORGE W. HAYDEN, a citizen of the United States, residing at Chicago, in the county of Cook and State of Illinois, have invented certain new and useful Improvements in Engineers' Brake-Valves, of which the following is a full, true, and complete specification.

This invention relates to improvements in engineers' brake-valves, for use in connection with air-brake systems, the manner and purpose of its use being identical with that of the well-known Westinghouse engineer's brake and equalizing discharge-valve, especially designed for use in connection with quick-action automatic air-brake systems.

One of the objects of my invention is to dispense with the rotary three-way cock heretofore commonly employed in engineers' brake-valves for controlling the various air ports and passages thereof, and at the same time secure more prompt and certain operation with less attention and less careful handling and manipulation, besides materially reducing the cost and complexity of the device as a whole.

Another object is to disassociate the "emergency" exhaust-port, its controlling-valve and operating mechanism from the main valve, which controls all the other ports of the device, and yet have these devices capable of operation by the same lever that controls and operates the main valve and by a continuous operation, as heretofore.

A further object is to have the emergency exhaust-port controlling and operating devices of such character that such port cannot be opened, and an "emergency stop" effected, inadvertently or without due notice to the engineer, and yet have the device capable of ready and instantaneous operation at the will of the engineer, without extraordinary and deterrent effort.

A further object is to have the pump-governor alternately controlled by the pressure of the train-pipe and the main reservoir, whereby the maximum excess pressure desirable in the main reservoir may be controlled and maintained under all circumstances.

A further object is to isolate the pump-governor from the train-pipe pressure in all positions of the valve, except when "on release," and have the maximum excess of pressure desirable in both the train-pipe and the main reservoir controlled and limited through a single pump-governor.

A further object is to utilize the air in the train-pipe for charging the graduation-reservoir and thereby actuating the graduation-valve for effecting a gradual reduction of pressure in the train-pipe in making "service stops" and at the same time permit the acceleration of the normal discharge of air from the graduation-reservoir and the chambers and passages connected therewith, whereby a graduation, exhaust and service stop may not only be more smoothly and gradually effected, but may be almost instantly arrested without the necessity for releasing the brakes in the usual manner.

A still further object of my invention is to avoid the necessity for keeping the graduation-reservoir and graduation release-valve constantly under train-pipe pressure and yet attain a gradual reduction of the train-pipe pressure at will and to any desired extent, thereby gaining all the efficiency and beneficial results and effects of graduation-exhaust while avoiding the objections attending the employment of constant train-pipe pressure in the graduation-reservoir; and, finally, to provide certain novel details and combinations of elements in the carrying out of my invention, as illustrated in the accompanying drawings, showing devices for accomplishing all these objects, and in which—

Figure 1 shows a side elevation of an engineer's valve embodying my invention; Fig. 2, a similar view with the cap for the valve-chamber and the mechanism connected therewith removed; Fig. 3, a horizontal section on the line 3 3 of Fig. 1, showing the main-reservoir excess-pressure valve broken away in section on the line 3ª of Fig. 1; Fig. 4, a central vertical section on the line 4 4 of Fig. 3, looking in the direction indicated by the arrows; Fig. 5, a horizontal section on the line 5 5 of Fig. 4; Fig. 6, a horizontal section on the line 6 6 of Fig. 4; Figs. 7 to 11, inclusive, diagrammatic views illustrating the relative positions of the slide-valve and all the ports controlled thereby when the engineer's valve is in "release," "running," "lap," "service-stop," and "emergency-stop" positions, respectively; and Figs. 12 to 15, inclusive, diagrammatic front elevations showing the slide-valve in dotted positions corresponding to the positions shown in Figs. 8 to 11, inclusive, but in each figure showing only the ports and passages that are in operation in the respective positions of the slide-valve. Fig. 16 is a detail view of a modification.

In the drawings, A indicates the slide or main valve; B, the chamber in which the same is located; and C, a passage (shown in dotted lines in Fig. 3 and in full lines in Fig. 5) connecting the main valve-chamber with the main reservoir (not shown) with which it has open communication, said chamber being at all times under reservoir-pressure.

At one side of the passage C is located the train-pipe chamber D communicating through a port E (shown in dotted lines in Fig. 4 and in full lines in Fig. 2) with the valve-chamber B, and also having open communication through a passage F (shown in dotted lines in Fig. 4 and in full lines in Fig. 6) with the emergency valve-chamber G, which latter is located below and slightly to one side of the engineer's lever H in convenient position to be operated thereby in the manner hereinafter described.

Above the train-pipe chamber D is located the graduation exhaust-chamber I, and above that the graduation piston-chamber J, the preferred relative arrangement and location of these parts, as well as all other parts of my brake-valve, being clearly illustrated in the drawings, on which are also indicated the various connections by short descriptive terms, such as "train-pipe connection," "main-reservoir connection," "graduation-exhaust connection," "train-pipe-gage connection," "graduation-reservoir connection," &c., for greater clearness in description and to facilitate the reading of the drawings, in all the figures of which, except the diagrammatic views, these designations are made wherever the parts occur.

The various positions of the engineer's lever in the operation of the device are also indicated on Fig. 1, the terms employed for such positions meaning the same in this engineer's valve as in others of the same class, and are too well understood to require detail description. There are, however, several principal features of distinction between this valve and any other known to me, and I will therefore proceed to describe the construction and operation of these devices before explaining the general operation of the device as a whole.

The first distinctive feature is the main valve A, which is a slide-valve, preferably rectangular or oblong in shape, having the longitudinal passages K L, formed in the inner or working face thereof in the upper part of the valve, and the oblique or angular passage M, formed in the same face near the lower part thereof, the location and arrangement of which passages will be readily understood from the drawings and particularly from Figs. 3, 4, and 7 to 11, inclusive. The valve is held to its seat by a spring of any suitable character, such as the flat spring N, (illustrated in Figs. 3 and 4,) which spring is materially assisted in its work of retaining the valve upon its seat by the air-pressure which always exists in the valve-chamber, as before described. This valve is operated to slide vertically upon its seat by a crank-arm O provided on its outer end with a lateral projection, or, if desired, an antifriction-roller P, working in a complementary transverse groove formed in the outer face of the valve near the upper end thereof. The crank-arm O is rigidly mounted at its inner end upon a short rock-shaft Q, having suitable bearings in the cap R, in which the valve-chamber is formed, and having rigidly secured to the outer end thereof the engineer's lever H, fitted on the prismatic end of said shaft. Obviously, whenever the engineer's lever is shifted to any of its different positions, the slide-valve will be correspondingly shifted through the intermediary of the rock-shaft and crank-arm, so as to move the slide-valve to a corresponding position, bringing into play the proper ports connecting the various chambers of the device.

The use of a slide-valve as a main valve instead of the rotary valve heretofore commonly employed possesses numerous advantages, among which may be mentioned the comparatively small cost thereof, the certainty of its operation, it being not subject to the ordinary objections of the rotary valve, such as inefficiency due to lodgment of dust and cinders and unequal or undue wear, which render them defective if not useless, for my slide-valve is self-cleaning, with no place for lodgment for foreign substance, and, besides, the wear thereof does not affect the operativeness of the device, because the wear is not only equally distributed, but is taken up as fast as it occurs, which is not and cannot be the case with any rotary valve, and consequently no leakage from any of the ports controlled thereby can occur.

The next distinctive feature is the emergency exhaust for suddenly reducing the train-pipe pressure in order to effect an instantaneous application of all the brakes in making an emergency stop. This exhaust is made from the chamber G, which has open communication with the train-pipe chamber D direct to the open air through the emergency exhaust-port S, which is normally closed by the valve T, held upon its seat by the combined influence of the coil-spring U or equivalent yielding device and the pressure of the air in the emergency exhaust-chamber. The valve T is provided with a stem V, extending outside of the valve-casing, in convenient position to be engaged by a crank-arm W, which may either form a part of the engineer's lever or be independently keyed or otherwise rigidly secured upon the rock-shaft Q. This arm comes into play only when the engineer's lever is given its extreme movement to the point marked "emergency stop" on Fig. 1, and the effect of the contact between the arm W and the valve-stem V is to unseat the valve T against the pressure of the spring U and the air in the chamber G, thereby exhausting said chamber and consequently the train-pipe direct into the open air through the port S, it being understood that the train-pipe, through the train-pipe chamber D and passage F, is at all times in open communication with the emergency exhaust-chamber. By this arrangement of the emergency-exhaust, disassociating the same from the main valve, the liability of inadvertently making an emergency stop is reduced to the minimum, for, when the arm W comes in contact with the stem of the emergency exhaust-valve, the further movement of the engineer's lever will be opposed by the spring U and the train-pipe pressure with sufficient force to retard the movement of the lever, and thus give due notice to the engineer before the emergency exhaust-port is opened. Should it be desired, however, to effect an emergency stop, the spring U and the air-pressure in the emergency exhaust-chamber do not offer sufficient resistance to require extraordinary or deterrent effort on the part of the engineer to open the exhaust-port of said chamber, for the same may be instantly effected, and by a continuous movement of the engineer's lever, with but comparatively slight effort on his part and without any appreciable loss of time. The value of this arrangement will be readily appreciated when it is borne in mind that with the rotary valve heretofore employed the only difference between effecting a service stop and an emergency stop is in the additional movement of the engineer's lever, without any change of resistance to such movement, and, consequently, engineers become careless in the application of brakes and very readily acquire the habit of applying emergency stops when no occasion exists therefor, which frequently results in the flattening of the wheels from the sliding of the same on the rails.

Another distinctive feature of my device is the manner of effecting a graduation-exhaust of the train-pipe for gradually reducing the pressure thereof in making service stops. The devices for accomplishing this result consist of the graduation-valve $a$, normally closing a port between the train-pipe chamber D and the graduation exhaust-chamber I, and provided with a stem $b$ extending up into the graduation piston-chamber J, which stem has rigidly secured thereto the graduation-piston $c$, having an air-tight fit in the chamber J, but provided with a vent-port $d$ therein, permitting the passage of the air from the under side of the piston into the upper part of the piston-chamber, from whence it escapes through the exhaust-port $e$ to the open air. The graduation-valve $a$ is held upon its seat by the coil-spring $f$, confined between the piston $c$ and the cap of the piston-chamber, or in any other suitable manner, the said spring exerting sufficient force to prevent the unseating of the valve by the pressure of the air in the train-pipe chamber on the small area thereof exposed to such pressure. The graduation piston-chamber J is connected at a point below the lowest position of the graduation-piston $c$—for instance, at the point $g$—with the usual small reservoir, (not shown,) which I will designate as the "graduation-reservoir," and which in effect simply constitutes an enlargement of the graduation piston-chamber, the same as with the corresponding devices of the Westinghouse engineer's brake and equalizing valve. There is this distinction, however, between the operation of my devices and the Westinghouse devices: that the unseating of the graduation exhaust-valve of the Westinghouse device is effected by exhausting the air direct from the graduation-reservoir and the piston-chamber connected therewith, in which air-pressure is at all times maintained, the graduation-reservoir being always open to one side of the graduation-piston, and balances the train-pipe pressure on the other side of said piston. I, on the other hand, never have air-pressure in the graduation-reservoir, except for a few seconds, it being always free to escape therefrom as quickly as possible through the open exhaust-ports leading to the air, and the piston never has air-pressure on but one side.

Another distinction is that the graduation-reservoir is always charged direct from the main reservoir and is open to train-pipe pressure only after being charged for purpose of equalization of pressure on the piston, while my air supply comes direct and only from the train-pipe chamber, and consequently from the train-pipe, and therefore this effects a more gradual reduction of train-pipe pressure than is possible with the Westinghouse device, the initial exhaust of the train-pipe being into the graduation-reservoir. For instance, when it is desirable to effect a service stop the main valve A is shifted to such position that the air from the train-pipe chamber passes through the ports E and 1 and the passages L in the main valve and 2 in the casing into the graduation exhaust-chamber $j$ below the graduation piston, and thence through the opening $g$ into the graduation reservoir, causing the piston to rise in its chamber, carrying with it the valve $a$ off of its seat, which opens communication between the train-pipe chamber D and the graduation exhaust-chamber I, from whence the air is exhausted direct to the open air through the passages 3 and 4 in the casing, and K in the main valve, and ports 5 and 6 in the casing, which are brought into play by the same movement of the main valve, all of which will be clearly understood by reference to Figs. 2, 4, and 10. While this action is taking place, the air admitted to the graduation-chamber J, below the piston, and to the graduation-reservoir is being exhausted through the ports $d$ and $e$, and the duration of the unseating of the graduation-valve $a$ will depend upon and be governed by the amount of air admitted to the graduation piston-chamber J and the graduation-reservoir, and the time consumed in exhausting the same therefrom, for, as soon as it is sufficiently reduced, the coil-spring $f$ takes effect and causes a reseating of the graduation-valve and the shutting off of communication between the train-pipe chamber and the graduation exhaust-chamber. At no other time is there any air-pressure in the graduation piston-chamber or the graduation-reservoir.

Now, then, supposing the engineer has started to make a service stop, throwing the valve to the position shown in Fig. 10, and suddenly changes his mind, deciding not to make the service stop, but continue running. This can be done of course in the usual manner by throwing the valve to "release position," which involves, however, both loss of time and considerable air; but my device is so arranged that the same result can be effected without releasing the brakes in the usual manner, by simply throwing the valve to "running position," as illustrated in Fig. 8. In this position the passage and port 3 and 5, leading from the graduation exhaust-chamber, are not only blanked and therefore instantly arrest the exhaust from the train-pipe, but the graduation-reservoir and the exhaust piston-chamber below the exhaust-piston are simultaneously opened to the air through the comparatively large ports and passages 2 at L K 6 4 and the cross-port L' in the casing, which in this position connects the longitudinal ports L and K in the valve, as illustrated in Figs. 3 and 8. The air in the graduation-reservoir and exhaust piston-chamber will therefore be quickly exhausted without waiting for the comparatively slow exhaust through the ports $d$ and $e$, as would otherwise be necessary, and the graduation-valve $a$ will be quickly returned to its seat, thus cutting off any possibility of further exhaust from the train-pipe chamber. The air exhausted from the train-pipe by this operation will be immediately supplied from the main reservoir, restoring the pressure to the normal seventy pounds therein and in the auxiliary reservoir, and the brakes have become partially set by the partial reduction of the train-pipe pressure. It will also be noticed that any leakage which may occur at the graduation-valve into the graduation exhaust-chamber will be rendered harmless by the main valve, which closes the port 5 at the end of the passage 3 leading from the graduation exhaust-chamber.

Another distinguishing feature of my device is the safety-check for the pump-governor for maintaining an excess pressure in the main reservoir and yet limiting the pressure therein to the desired maximum, when the usual twenty-pound check is in operation for obtaining an excess pressure in the main reservoir over the pressure in the train-pipe it being understood that the standard pressure in the train-pipe is seventy pounds while it is desirable to carry ninety pounds pressure in the main reservoir, for the purpose of effecting a more prompt release of the brakes, making signals and supplying loss by leakage either from the train-pipe and connections or the main reservoir. To this end, my valve is so arranged that when the train-pipe is in open communication with the main reservoir, the governor is also in open communication therewith through the port 7 and passage 8, (see Figs. 2, 3, and 7,) leading to the pump-governor connection, and will cause the pump to cease working as soon as the pressure in the train-pipe and main reservoir attains the maximum train-pipe pressure of seventy pounds, the main valve at this time being in position for release, but, when the main valve is in running position, communication between the main reservoir and train-pipe is had only through a by-pass or branch passage 9, passages 10 and 11, ports 12 and E, and oblique passage M, as shown in Figs. 2, 3, and 8. In the branch passage 9 is located a twenty-pound spring check-valve 13 of ordinary or usual construction, which thus enables the accumulation of an excess pressure of twenty pounds in the main reservoir before any air can escape therefrom to the train-pipe, unless the pressure in the latter is reduced by leakage or otherwise.

While it is desirable and important that there should be maintained an excess pressure in the main reservoir in all positions of the valve except release, it is not desirable under ordinary conditions that the pressure therein should exceed ninety pounds, and for this reason I provide a diaphragm-valve 14 in the passage 15, connecting the main valve-chamber, and consequently the main reservoir, with the pump-governor, the main valve not closing the port 16 of said passage when in running position, as illustrated in Figs. 2, 3, and 8. Hence, when the pressure in the main reservoir reaches the desired maximum of ninety pounds, the said diaphragm-valve will be unseated against the force of its retaining-spring 17, and admit air to the pump-governor, and thereby cause the governor to cease working as long as the pressure remains at the desired maximum. It will thus be seen that the ordinary single pump-governor may be employed in connection with my engineer's brake-valve, and instead of being connected direct with the train-pipe or the main reservoir or both, as has heretofore been the practice, it may be connected by a single passage with the valve and alternately subjected to train-pipe and reservoir pressure, according to the position of the engineer's lever. Hence, when subjected to train-pipe pressure, as in the release position, as long as the pressure therein remains below the desired maxium of seventy pounds, the pump will continue to work, but as soon as the desired maximum is reached the working of the pump will be automatically arrested. On the other hand, when subjected to the reservoir pressure, as in running position, as soon as the pressure attains the desired maximum, the pump will be caused to cease working, but whenever the pressure in the main reservoir is reduced for any cause, the pump will immediately begin work and restore the pressure to the desired maximum.

Another and very desirable advantage of having the pump-governor controlled by the engineer's lever through the main valve is that whenever it is desirable to raise the pressure in the main reservoir above the normal maximum, especially in handling very long trains, by throwing the valve to the "lap" position all communication between the main reservoir and the pump-governor will be cut off by the blanking of the ports 7 and 16, as illustrated in Fig. 9, when the pressure in the main reservoir may be increased to any desired extent.

The general operation of the device is as follows: When the engineer's lever is on the release position, as shown in Figs. 1 to 7, inclusive, the port E between the valve-chamber B and the train-pipe chamber D is uncovered by the valve, and, hence, there is open communication between the main reservoir and the train-pipe, thus permitting the air to flow freely from the reservoir into the train-pipe for the double purpose of releasing the brakes and recharging the auxiliary reservoirs under each car. In this position also the ports 7 and 16 are both uncovered, the air having unobstructed passage from the port 7 to the pump-governor through the passages and connections previously described. When the engineer's lever is moved to running position, all the ports except 16 are closed by the main valve, and communication between the main reservoir and the train-pipe is now had only through the passages 9, 10, 11, and M, in the first mentioned of which passages is located the twenty-pound check-valve for accumulating excess pressure in the main reservoir, which, when it reaches the desired maximum, will cease to accumulate by reason of the action of the air on the safety check-valve, which guards the passage leading from the main reservoir to the pump-governor through the port 16, as before described. On lap position all ports are blanked and no air can escape from the main reservoir either to the pump-governor or the train-pipe. On service-stop position the train-pipe is connected with the small reservoir and exhaust piston-chamber, permitting the air to first pass from the train-pipe into said reservoir and chamber and afterward direct to the open air through the graduation exhaust-chamber and the passage before described, which are also brought into operative position by the same movement of the valve. In this position, however, all ports are blanked as to the main-reservoir pressure. On emergency-stop position all ports are blanked as to the main reservoir, but the exhaust-port of the emergency exhaust-chamber is open, thus permitting the air from the train-pipe to be directly and quickly exhausted, causing an instantaneous setting of all the brakes in the usual manner.

The diagrammatic views 7 to 11 show the relative positions of the main valve and the ports in the casing in release, running, lap, service-stop, and emergency-stop position, respectively, the valve and its passages being shown in dotted lines and the ports in full lines.

In Figs. 12 to 15, inclusive, the valve and ports are shown, respectively, in dotted and full lines, representing the parts in running, lap, service-stop, and emergency-stop positions, respectively, but in each figure showing only the ports and passages that are connected and in operation; but, as will be readily understood from the explanations previously given, some of the ports and passages connected in these positions perform no duty at this time, but are simply arranged to make the connection so that they may be employed for rendering incidental and unusual services, as before described.

Obviously, numerous changes and modifications of the devices and arrangement of devices herein shown and described may be made without departing from the spirit of my invention, such as the character and disposition of the various ports, passages, and connections, the devices and arrangement shown being simply illustrative and preferred by me at the present time as best adapted for carrying out my invention. For instance, the connection between the engineer's lever and the main valve may be radically different from that shown so long as the operation of the main valve is effected by or through the engineer's lever, and so also may the manner of and means for operating the emergency exhaust-valve by or through said lever be materially different from that shown and described, so long as the desired result is attained.

Again, the graduation exhaust-chamber and the exhaust ports and passages connecting the same with the open air through the main valve may be dispensed with and the train-pipe be exhausted direct into the open air through a port 20 guarded by the graduation-valve in the usual manner, while the exhaust-port through the graduation-piston may be dispensed with and the piston-chamber be exhausted direct into the open air through a port 19 opened by the raising of the piston, as illustrated in Fig. 16, these changes being so obvious as not to require special illustration. Likewise the safety-check for controlling the pump-governor in maintaining and limiting the excess pressure in the main reservoir to the desired maximum may be located at any point, and even upon the pump-governor itself, so long as the desired result is accomplished thereby; but the construction, arrangement, and relative location of all these devices herein shown and described is preferred because of the advantages resulting therefrom, as hereinbefore set forth.

What I claim as new, and desire to secure by Letters Patent, is as follows:

1. In an engineer's valve, the combination with the engineer's lever, of an "emergency" exhaust port for the train-pipe, and a valve, independent of the main valve, normally closing said port and arranged to be unseated by the said lever, substantially as described.

2. In an engineer's valve, the combination with the engineer's lever, of an "emergency" exhaust port for the train-pipe, a valve, independent of the main-valve, normally closing said port, and an arm or projection on said lever arranged to unseat said valve, substantially as described.

3. In an engineer's valve, the combination with an "emergency" exhaust chamber having open communication with the train-pipe, an exhaust port therefor, and a spring-actuated valve, independent of the main valve closing said exhaust port, of the engineer's lever adapted and arranged to unseat said valve, substantially as described.

4. In an engineer's valve, the combination with an "emergency" exhaust chamber provided with an exhaust port and having open communication with the train-pipe, of a spring-actuated valve, independent of the main valve, closing said exhaust port, the engineer's lever, and an arm or projection on said lever, adapted and arranged to force said valve from its seat, substantially as described.

5. In an engineer's valve, the combination with an "emergency" exhaust chamber provided with an exhaust-port and having open communication with the train-pipe, of a spring-actuated valve, independent of the main valve, closing said exhaust port, the stem of said valve projecting beyond the casing therefor, the engineer's lever, and an arm or projection upon said lever adapted and arranged to engage said valve stem, substantially as described.

6. In an engineer's valve, the combination with the casing provided with a main valve chamber having open communication with the main reservoir, and ports and passages opening into said chamber, and a slide valve controlling said ports and passages, of an "emergency" exhaust chamber provided with the exhaust port and having open communication with the train-pipe, a spring-actuated valve, independent of the slide valve, closing the exhaust port, and the engineer's lever having a permanent connection with the slide-valve, but adapted and arranged to unseat said "emergency" chamber valve, substantially as described.

7. In an engineer's valve, the combination with the casing, provided with a main valve chamber having open communication with the main reservoir, and ports and passages opening into said chamber, and a slide-valve controlling said ports and passages, of an "emergency" exhaust chamber provided with the exhaust port and having open communication with the train-pipe, a spring-actuated valve, independent of the slide valve, closing the exhaust port, a rock-shaft, a crank-arm secured to one end of said shaft and permanently engaging the slide-valve, the engineer's lever secured to the other end of said shaft, and an arm or projection thereon adapted and arranged to unseat said "emergency" exhaust valve, substantially as described.

8. In an engineer's brake valve the combination of a valve casing provided with connections to a main air reservoir and to a main air or train-pipe, a regulating cock or valve controlling communication between said connections, an exhaust or discharge valve controlling communication between the main air or train-pipe and the atmosphere and an operating lever imparting movement to the regulating cock or valve and to the exhaust or discharge valve, substantially as set forth.

9. In an engineer's brake valve, the combination of a regulating cock or valve, a lever handle journaled in a bearing independent of said regulating cock or valve and coupled thereto, an emergency exhaust or discharge valve, and an arm fixed to said lever handle and imparting movement to said emergency exhaust or discharge valve, substantially as set forth.

10. In an engineer's valve, the combination with a graduation exhaust port for the train-pipe, and a spring-actuated valve normally closing said port, of the graduation piston chamber, the graduation piston working therein and attached to said valve, an exhaust port for said chamber above the piston, a passage connecting said chamber below the piston with the train-pipe, and a main valve controlling said passage, substantially as described.

11. In an engineer's valve, the combination with a graduation exhaust port for the train-pipe and a spring actuated valve normally closing said port, of the graduation piston chamber, having an exhaust port, the graduation piston working in said chamber below said port, having an exhaust port therethrough, said piston being attached to said valve, the small reservoir connected with said chamber below the piston, a passage connecting said chamber below the piston with the train-pipe, and a main valve controlling said passage, substantially as described.

12. In an engineer's valve, the combination with the graduation exhaust chamber and the spring-actuated graduation valve normally closing said chamber to the train-pipe, of the graduation piston chamber provided with an exhaust port, the graduation piston located therein, having an exhaust port therethrough and attached to the graduation valve, ports and passages connecting the train-pipe with the graduation piston chamber below the piston, and the main valve controlling said ports, substantially as described.

13. In an engineer's valve, the combination with the graduation exhaust chamber, and spring-actuated graduation valve normally closing said chamber to the train-pipe, of the graduation piston chamber provided with the exhaust port, the graduation piston working therein having an exhaust port therethrough, and attached to the graduation valve, ports and passages connecting the train-pipe with the graduation piston chamber below the piston, ports and passages connecting the graduation exhaust chamber with the open air, and the main valve controlling said ports and passages, substantially as described.

14. In an engineer's valve, the combination with the graduation exhaust chamber and a spring actuated graduation valve normally closing said chamber to the train-pipe, of the graduation piston chamber provided with an exhaust port, the graduation piston working therein having an exhaust port therethrough and attached to the graduation valve, the small reservoir connected with the graduation piston chamber below the piston, ports and passages connecting the train-pipe with the graduation piston chamber also below the piston, and a main valve controlling said ports and passages, substantially as described.

15. In an engineer's valve, the combination with the graduation exhaust chamber and a spring-actuated graduation valve normally closing said chamber to the train-pipe, of the graduation piston chamber provided with an exhaust port, the graduation piston working therein, having an exhaust port therethrough, and attached to the graduation valve, the small reservoir connected with the graduation piston chamber below the piston, ports and passages connecting the train-pipe with the graduation piston chamber also below the piston, and a main valve operated to alternately connect said exhaust piston chamber with the train-pipe and with the open air, through said ports and passages, substantially as described.

16. In an engineer's valve, the combination with the graduation exhaust chamber, a spring-actuated graduation valve normally closing said chamber to the train-pipe, a graduation piston chamber provided with an exhaust port, and a graduation piston having an exhaust port therethrough and attached to the graduation valve, of ports and passages connecting the train-pipe with the graduation piston chamber below the piston, a main slide valve controlling said ports and passages, and the engineer's lever connected with, so as to operate, said valve, substantially as described.

17. In an engineer's valve, the combination with the graduation exhaust chamber, a spring-actuated graduation valve normally closing said chamber to the train-pipe, a graduation piston chamber provided with an exhaust port, and a graduation piston having an exhaust port therethrough and attached to the graduation valve, of ports and passages connecting the train-pipe with the graduation piston chamber below the piston, a main slide valve controlling said ports and passages, a rock-shaft, an engineer's lever secured to one end of said shaft, and a crank-arm on the other end of said shaft engaging the slide-valve, substantially as described.

18. In an engineer's valve, the combination with a main valve chamber having open communication with the main reservoir, a train-pipe chamber having open communication with the train pipe, a port connecting said chambers, a graduation exhaust chamber, a spring actuated graduation valve normally closing said chamber to the train-pipe, a graduation piston chamber having an exhaust port, the graduation piston working therein having an exhaust port therethrough and attached to the graduation valve, and a port and passage connecting the graduation piston chamber below said piston with the main valve chamber, of the main valve adapted and arranged to connect said port and passage with the port connecting the main valve and train-pipe chambers, substantially as described.

19. In an engineer's valve, the combination with a main valve chamber having open communication with the main reservoir, a train-pipe chamber having open communication with the train-pipe, a port connecting said chambers, a graduation exhaust chamber, a spring-actuated graduation valve normally closing said chamber to the train-pipe chamber, a graduation piston chamber having an exhaust port, the graduation piston working therein having an exhaust port therethrough and attached to the graduation valve, and a port and passage connecting the graduation piston chamber below said piston with the main valve chamber, and the main valve adapted and arranged to connect said port and passage with the port connecting the main valve and train-pipe chambers, and to simultaneously open passages and ports leading from the graduation exhaust chamber to the open air, substantially as described.

20. In an engineer's valve, the combination with a pair of passages connecting the main reservoir with the pump-governor and adapted to be successively closed by the main valve, of a spring-actuated valve located in the last closed passage and normally closing the same against any pressure in the reservoir less than the desired maximum, substantially as described.

21. In an engineer's valve, the combination with a single passage connecting the main reservoir with the pump-governor, and a branch passage therefrom also leading to the main reservoir, the ports of said passages being successively closed by the main valve, of a spring-actuated check valve in the branch passage normally closing the same against any pressure in the reservoir less than the desired maximum, said branch passage being closed after the main passage is closed, substantially as described.

22. In an engineer's valve, the combination with the main valve chamber having open communication with the main reservoir, a train-pipe chamber having open communication with the train-pipe, a port connecting said chambers and a port connecting the main valve chamber with the pump-governor, of the main valve located in said valve chamber and adapted and arranged to simultaneously close said ports, substantially as described.

23. In an engineer's valve, the combination with the main valve chamber having open communication with the main reservoir, the train-pipe chamber having open communication with the train-pipe, a port connecting said chambers and a passage connecting said chamber with the pump-governor, of a branch passage leading from the first mentioned passage to the main valve chamber, a spring-actuated valve in said passage normally closing the same against any pressure in the main reservoir less than the desired maximum, and the main valve adapted and arranged to close the branch passage after the main passage and the port connecting said chambers are closed, substantially as described.

24. In an engineer's valve, the combination with the main valve chamber having open communication with the main reservoir, the train-pipe chamber having open communication with the train-pipe, a port connecting said chambers, a passage connecting the main valve chamber with the pump-governor, a branch passage connecting the main valve chamber with the main reservoir and a spring-actuated check valve located in said passage, of the main valve adapted and arranged to simultaneously close the passage between the main chamber and the pump-governor, and the port between the valve and train-pipe chambers, and to open communication between said port and the branch passage, of a branch passage also connecting the main valve chamber with the main passage leading to the pump-governor and adapted to be closed after the other passages and port are closed, and a spring-actuated valve located in said branch passage and normally closing the same against any pressure in the main reservoir less than the desired maximum, substantially as described.

GEORGE W. HAYDEN.

Witnesses:
 TODD MASON,
 O. R. BARNETT.